Patented Dec. 20, 1949

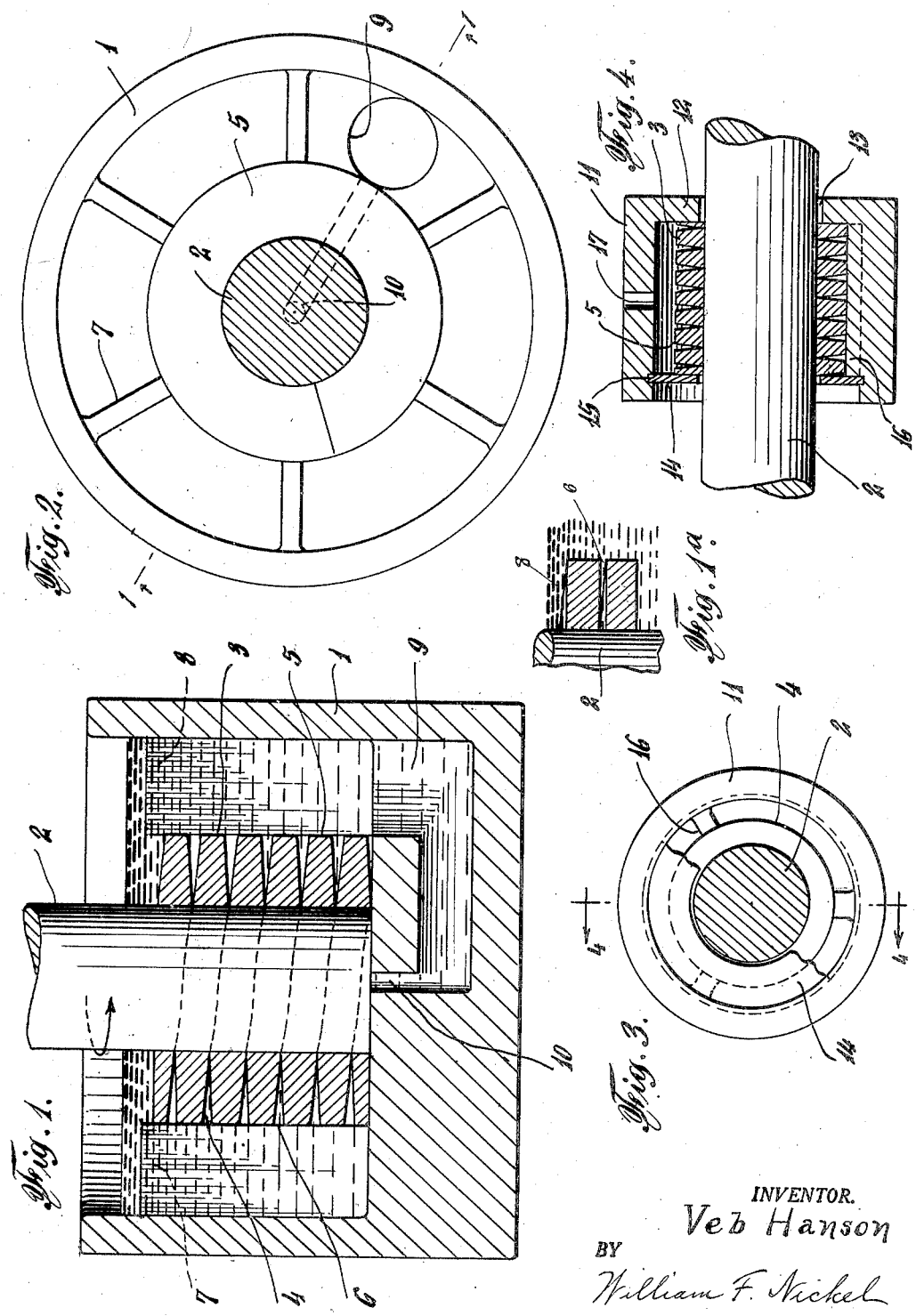

2,491,558

UNITED STATES PATENT OFFICE 2,491,558

SHAFT BEARING

Veb Hanson, Storrs, Conn.

Application August 23, 1944, Serial No. 550,761

3 Claims. (Cl. 308—240)

My invention pertains to a novel type of bearing; and more particularly to a bearing to receive a rotating shaft and supply efficient lubrication to same.

An important object of this invention is to provide a bearing which is adapted to conduct and impel the lubricant to the rotating shaft and distribute it over the entire outer surface thereof; which is economical and thorough in its action; and which can be produced at very little expense.

My improved bearing is especially designed for use in vacuum cleaners and other domestic appliances. Ball bearings in such apparatus are too expensive; and the best bearings now available therefor are radial bearings of an oil retaining material, such as porous bearings made from compressed metal powders. In contrast to these my invention takes the form of a wire of bronze, substantially rectangular in cross section, wound so closely around the shaft with which it is used that capillary action comes into play to force the lubricant into contact with the surface to be treated, and spread it in a continuous film over the total area thereof. The lubrication is thus adequately accomplished, so long as any of the lubricant remains.

Another object of this invention is to provide a bearing comprising a casing of suitable construction to house and mount the bronze wire and to serve as a container for the lubricant when the bearing performs its chief function.

The advantages of the invention are fully disclosed in the following specification taken in connection with the accompanying drawings. But the description is by way of illustration only; and I do not wish to be limited to the exact mechanism shown herein; but in practice I reserve the right to make various changes in the shape, size and arrangement of parts; without altering the essential character of the invention, or deviating from the principle thereof.

On the drawings:

Figure 1 is an axial sectional view showing one form of my invention, taken on the line 1—1 of Figure 2.

Figure 1a shows a detail.

Figure 2 is a top plan of what appears in Figure 1.

Figure 3 is an end view of a modified form of my invention; and

Figure 4 is an axial section on line 4—4 of Figure 3.

The same numerals identify the same parts throughout.

The numeral 1 indicates a casing, preferably a die-casting of zinc, with a closed bottom and open top to receive the end of a vertical rotatable shaft 2. The foot of this shaft rests on the bottom of the casing; and is encircled within the latter by a bronze wire 3 of large width in relation to its thickness wound about the shaft 2; and extending from the bottom towards the top of the casing 1. The width of the metal strip or wire is perpendicular to the shaft. The opposite faces 4 of the turns or spirals 5 of the wire helix 3 are close together, but are still separated by a capillary space 6. The wire is rectangular in cross section, as depicted in Figure 1a; but in Figures 1 and 4, the section is shown as not perfectly rectangular to present the spaces 6 more plainly.

The interior of the casing has radial ribs 7, rising from the bottom and extending almost to the top. At their outer sides the ribs are integral with the cylindrical wall of the casing; while their inner edges are far enough from the shaft 2 to leave an annular space around the latter. This space is filled by the coils 5 of the wire 3. In practice it will be filled with oil 8, which will be poured in to fill the casing to a point above the tops of the ribs 7. In the bottom of the casing between two of the ribs 7 is a port 9, leading to a duct 10 which delivers oil to the center of the foot of the shaft 2.

The bronze wire 3 is wound closely around the shaft; and the thin, narrow spaces draw or impel the oil with considerable force, due to capillary attraction, inward to make contact with the shaft 2. The whole outside peripheral surface of the shaft therefore receives the lubricant which is spread in an even film over as much of the lower portion of the shaft as is encircled by the wire 3. Also the foot or thrust end of the shaft will be kept lubricated by oil from the duct 10.

The capillary action of the wound wire 3 will continue as long as there is any oil left in the casing. As the level of the oil sinks the oil continues to be forced against the shaft over the entire portion enveloped by the wire 3. The bearing is thus cheap to manufacture, easy to install and very efficient in operation.

The casing 1 is of course secured in suitable position with respect to the shaft 2.

For a horizontal shaft the arrangement of Figures 3 and 4 is utilized. This bearing comprises a fixed casing 11 through which the shaft 2 passes. One end 12 has an opening 13 just large enough for the shaft, while the other end is open but receives a washer 15, sprung or otherwise disposed and held in an inside groove 15. Before the washer is inserted the coiled wire 3, wound closely as before, is slipped on the shaft and into the casing. The latter has internal axial ribs 16, extending from end to end, the coiled wire 3 filling the annular space between the shaft and the inner edges of these ribs 16. Oil is admitted through a port 17. By capillary action the lubricant is again drawn in between the spirals and spread over the shaft 2, and the action continues as long as any lubricant remains in the casing 11.

My invention is thus well calculated to serve its intended purpose which is to furnish certain and efficient anti-friction bearing at low cost.

In practice, the helix is made up by first winding the bronze wire upon a round arbor or mandrel. In the beginning, the wire is rectangular; as appears from Figure 1a; but in the operation of winding the wire is of course compressed along its inner side and stretched on its outer side. Hence the width of the outer side or face decreases and becomes relatively narrower, and the inner face a little wider as seen in Figure 1. The helix in finished form thus consists of wire that is not strictly rectangular in cross section; it is rather quadrangular or only substantially rectangular; and the latter term is to be understood accordingly.

The space between adjacent turns of the wire helix is small, and converges or narrows slightly towards the shaft but is filled with oil; and in action the oil penetrates in to the surface of the shaft over the whole length of the helix, even when there is only a small quantity of oil present. The helix may be fixed in the casing or may rotate with the shaft; if rotatable, the turns will have such slope that the helix will act like a lifting screw in the vertical arrangement to raise the oil from the lower part of the shaft upward; and in the case of the horizontal arrangement, to carry the oil from end to end of the casing.

Having described my invention what I claim is new is:

1. A bearing for a shaft comprising an enclosing casing having a central space to receive a part of the shaft and a helix made of turns of bronze wire rectangular in cross-section wrapped closely together snugly enveloping said shaft in said casing, the latter having inside axial ribs running substantially from end to end closely surrounding said helix with spaces for oil between said ribs, the turns having intervals of capillary size between them to be filled with oil and distributed over the surface of said shaft.

2. A bearing for a vertical shaft having an open top and a closed bottom upon which the foot of the shaft rests, ribs on the inner lateral face of the casing and extending from the bottom towards the top, said ribs being separated by spaces for containing oil, and a helix of bronze wire rectangular in cross-section, the turns of which snugly envelop the lower part of the shaft within the casing, said helix being closely surrounded by said ribs, said turns being separated by capillary intervals to be filled with oil and distribute it over the surface of said shaft, said casing having a duct in the bottom at the foot of said shaft and leading therefrom to one of said spaces.

3. A helical bearing member for a shaft, comprising a strip of metal having a cross section with one dimension larger than the other, said strip being wound into a spiral with the turns thereof in close proximity to one another to envelop the shaft snugly and lie substantially in continuous contact therewith and with one another, the larger dimension being perpendicular to the shaft, the said strip being compressed along its inner half and stretched along its outer, with the inner faces of said turns wider than the outer faces, and the spaces between said turns convergent from the outer faces inward continuously to the inner faces to transmit lubricant through said spaces.

VEB HANSON.

REFERENCES CITED

The following references are of record in the file of this patent:

UNITED STATES PATENTS

| Number | Name | Date |
|---|---|---|
| 50,445 | Bruen | Oct. 17, 1865 |
| 425,569 | Gare | Apr. 15, 1890 |
| 1,200,060 | Wemp | Oct. 3, 1916 |
| 1,454,682 | Layne | May 8, 1923 |
| 1,745,425 | Johnson | Feb. 4, 1930 |
| 1,746,981 | Anderson | Feb. 11, 1930 |
| 1,858,315 | Thatcher | May 17, 1932 |
| 2,043,152 | Cook | June 2, 1936 |